US012811819B2

(12) United States Patent
Al-Banna et al.

(10) Patent No.: US 12,811,819 B2
(45) Date of Patent: Nov. 24, 2026

(54) NETWORK-BASED END-TO-END LOW LATENCY DOCSIS

(71) Applicant: ARRIS Enterprises LLC, Suwanee, GA (US)

(72) Inventors: Ayham Al-Banna, Irving, TX (US); Kevin S. Wirick, Encinitas, CA (US); Parasuram Ranganathan, Brampton (CA); Mircea Orban, Toronto (CA); Thomas J. Cloonan, Lisle, IL (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/070,960

(22) Filed: Nov. 29, 2022

(65) Prior Publication Data

US 2023/0171121 A1 Jun. 1, 2023

Related U.S. Application Data

(60) Provisional application No. 63/283,912, filed on Nov. 29, 2021.

(51) Int. Cl.
*H04L 12/28* (2006.01)
*H04L 47/2425* (2022.01)

(52) U.S. Cl.
CPC ...... *H04L 12/2801* (2013.01); *H04L 47/2425* (2013.01)

(58) Field of Classification Search
CPC . H04L 12/2801; H04L 47/2425; H04L 45/74; H04L 47/24; H04L 47/28
See application file for complete search history.

(56) References Cited

U.S. PATENT DOCUMENTS 6,742,059 B1 * 5/2004 Todd ..................... H04L 41/046 709/224
8,068,516 B1 * 11/2011 Oz .......................... H04L 9/088 725/111
11,038,820 B2 * 6/2021 Veiga .................. H04L 47/2416
2018/0343206 A1 * 11/2018 White ..................... H04L 47/11
2019/0349119 A1 * 11/2019 Nammi ................... H04L 1/003
2020/0053018 A1 2/2020 White et al.
2021/0029049 A1 1/2021 Assouline et al.
2021/0119941 A1 4/2021 Hoole et al.
2021/0184787 A1 * 6/2021 Iwabuchi .............. H04L 1/0017
2023/0115816 A1 * 4/2023 Iwai ...................... H04W 24/08 455/522
2023/0189056 A1 * 6/2023 Choi ..................... H04W 28/02 370/235

OTHER PUBLICATIONS

Machine translation of JP 2003022226 A, (Year: 2003).*
(Continued)

*Primary Examiner* — Jean B Corrielus
(74) *Attorney, Agent, or Firm* — Chernoff, Vilhauer, McClung & Stenzel, LLP

(57) ABSTRACT

Devices, systems, and methods that identify and mark traffic intended to pass through a network with low latency relative to other traffic through the network. The devices, systems, and methods may include a first low latency DOCSIS (LLD) agent that identifies characteristics of low latency packets and/or a second LLD agent that uses the characteristics to identify low latency traffic and mark it for low latency treatment in the network.

15 Claims, 11 Drawing Sheets

(56) References Cited

OTHER PUBLICATIONS

Machine translation CN 115396262 A. (Year: 2022).*
White K Sundaresan B Briscoe Cablelabs G: "Low Latency DOCSIS—Technology Overview; draft-white-tsvwg-lld-00.txt.", Transport Area Working Group, Internet Engineering Task Force, IETFI Standardworkingdraft, Internet Society (ISO, Mar. 12, 2019), pp. 1-25, XP015132011, Retrieved from the Internet: URL: https://tools.ietforg/html/draft-white-tsvwg-lld-00 [retrieved on Mar. 12, 2019] sections 3 and 4; p. 7-p. 13.
International Search Report and Written Opinion RE: Application No. PCT/US2022/051197, dated Mar. 21, 2023.

* cited by examiner

NETWORK-BASED END-TO-END LOW LATENCY DOCSIS

CROSS REFERENCE TO RELATED APPLICATIONS

The present application claims priority to U.S. Provisional Patent Application No. 63/283,912 filed Nov. 29, 2021, the contents of which are each incorporated herein by reference in their entirety.

BACKGROUND

The subject matter of this application generally relates to implementing low-latency traffic in a Data over Cable Service Interface Specification (DOCSIS) environment.

Cable Television (CATV) services have historically provided content to large groups of subscribers from a central delivery unit, called a "head end," which distributes channels of content to its subscribers from this central unit through a branch network comprising a multitude of intermediate nodes. Historically, the head end would receive a plurality of independent programming content, multiplex that content together while simultaneously modulating it according to a Quadrature Amplitude Modulation (QAM) scheme that maps the content to individual frequencies or "channels" to which a receiver may tune so as to demodulate and display desired content.

Modern CATV service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber, and to the content provider through the branch network.

To this end, these CATV head ends include a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). The foregoing architectures are typically referred to as centralized access architectures (CAA) because all of the physical and control layer processing is done at a central location, e.g., a head end.

Recently, distributed access architectures (DAA) have been implemented that distribute the physical layer processing, and sometimes the MAC layer processing deep into the network. Such system include Remote PHY (or R-PHY) architectures, which relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency as a QAM signal and converts the upstream RF data sent by cable modems from analog-to-digital format to be transmitted optically to the core. Other modern systems push other elements and functions traditionally located in a head end into the network, such as MAC layer functionality (R-MACPHY), etc.

Evolution of CATV architectures, along with the DOCSIS standard, have typically been driven by increasing consumer demand for bandwidth, and more particularly growing demand for Internet and other data services. However, bandwidth is not the only consideration, as many applications such as video teleconferencing, gaming, etc. also require low latency. Thus, the DOCSIS 3.1 specifications incorporated the Low Latency DOCSIS (LLD) feature to enable lower latency and jitter values for latency-sensitive applications by creating two separate service flows, where latency-sensitive traffic is carried over its own service flow that is prioritized over traffic that is not latency-sensitive. Although the DOCSIS 3.1 standard allows for bifurcation of traffic into low-latency and non-low-latency traffic, it does not specify how traffic is identified, or how it is placed onto a low latency service flow. While this can be solved by having client devices such as gateways inside the home mark the latency-sensitive traffic, these solutions are hardware-specific and depend on specific gateway implementation. Therefore, these solutions suffer from several deficiencies including (1) they require a CPE gateway with dedicated software as opposed to a mere modem, which not only makes these solutions more difficult to develop and maintain, but MSOs are dissuaded from working with these solutions given the variety of different hardware brands that need to be supported; (2) such solutions work with IPv4 but only have limited support with IPv6; and (3) such solutions may not work with other access technologies beyond DOCSIS—e.g., PON, 5G, Wi-Fi, etc.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
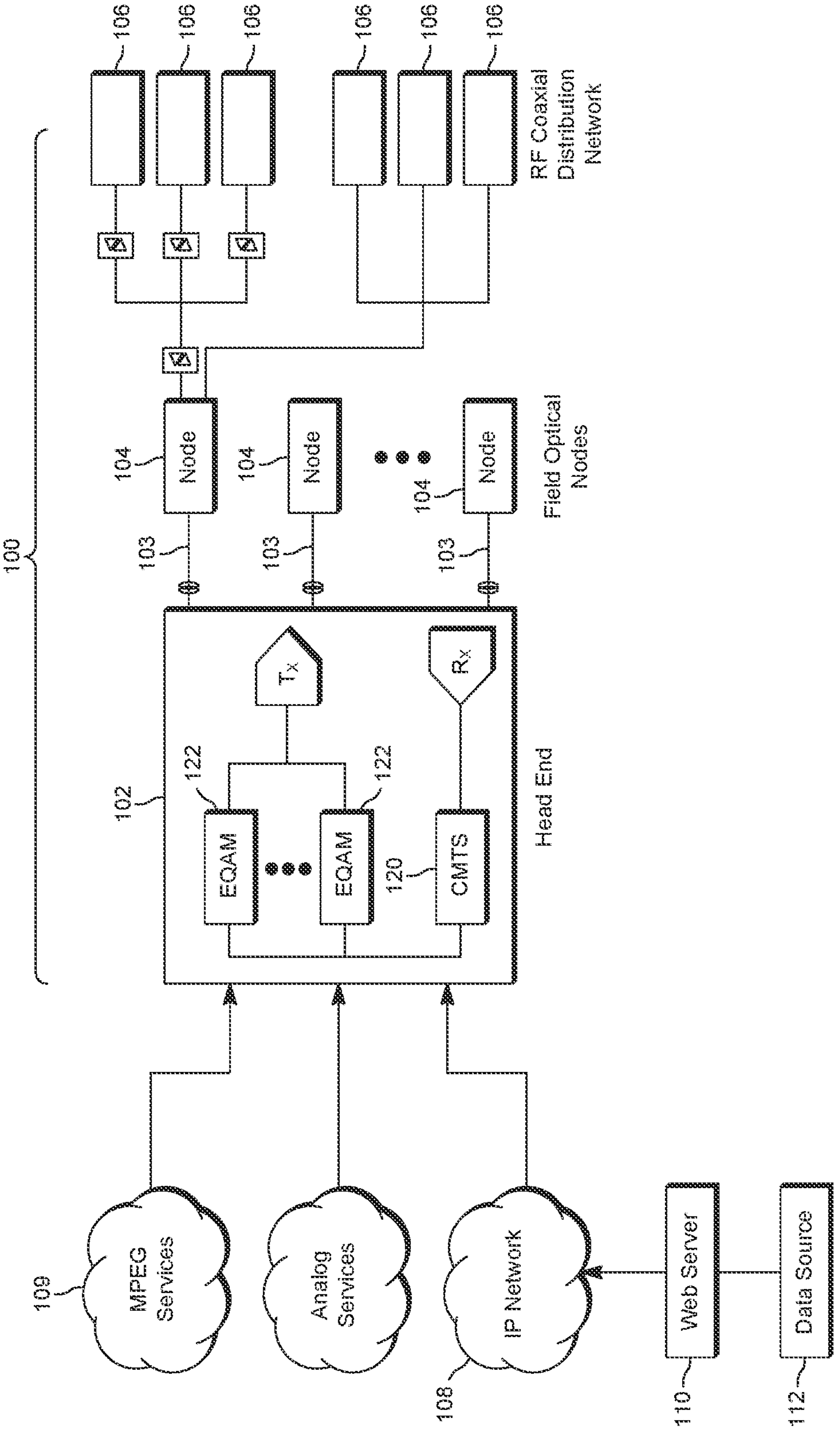
FIG. 1 shows an exemplary centralized access architecture (CAA) that may be used to implement the systems and methods disclosed in the present application.
Figure 2:
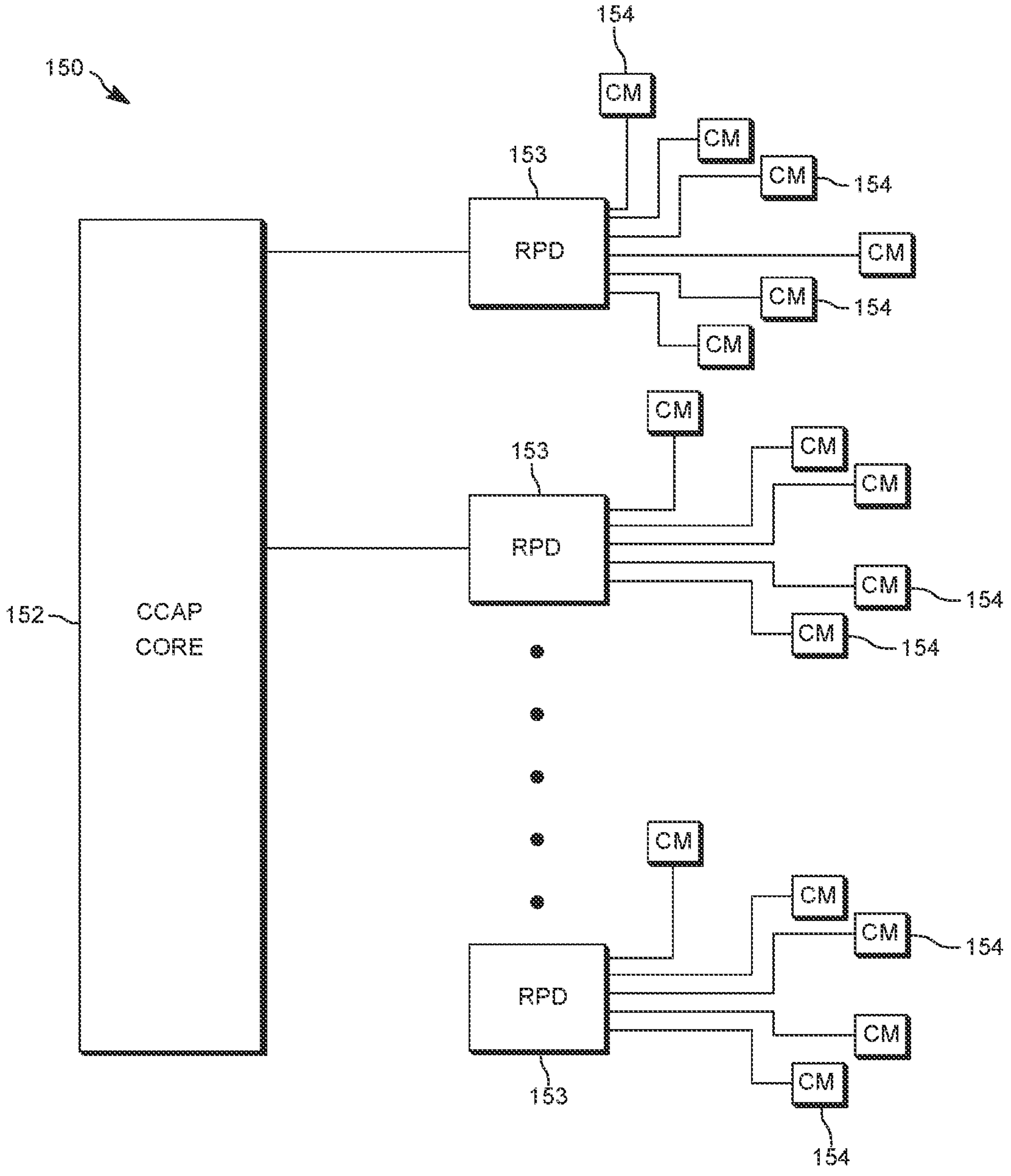
FIG. 2 shows an exemplary distributed access architecture (DAA) that may be used to implement the systems and methods disclosed in the present application

The devices, systems, and methods disclosed in the present application may be implemented with respect to a communications network that provides data services to consumers, regardless of whether the communications network is implemented as a CAA architecture or a DAA architecture, shown respectively in FIGS. 1 and 2.

Referring first to FIG. 1, a Hybrid Fiber Coaxial (HFC) broadband network 100 combines the use of optical fiber and coaxial connections. The network includes a head end 102 that receives analog or digital video signals and digital bit streams representing different services (e.g., video, voice, and Internet) from various digital information sources. For example, the head end 102 may receive content from one or more video on demand (VOD) servers, IPTV broadcast video servers, Internet video sources, or other suitable sources for providing IP content.

An IP network 108 may include a web server 110 and a data source 112. The web server 110 is a streaming server that uses the IP protocol to deliver video-on-demand, audio-on-demand, and pay-per view streams to the IP network 108. The IP data source 112 may be connected to a regional area or backbone network (not shown) that transmits IP content. For example, the regional area network can be or include the Internet or an IP-based network, a computer network, a web-based network or other suitable wired or wireless network or network system.

At the head end 102, the various services are encoded, modulated and up-converted onto RF carriers, combined onto a single electrical signal and inserted into a broadband optical transmitter. A fiber optic network extends from the cable operator's master/regional head end 102 to a plurality of fiber optic nodes 104. The head end 102 may contain an optical transmitter or transceiver to provide optical communications through optical fibers 103. Regional head ends and/or neighborhood hub sites may also exist between the head end and one or more nodes. The fiber optic portion of the example HFC network 100 extends from the head end 102 to the regional head end/hub and/or to a plurality of nodes 104. The optical transmitter converts the electrical signal to a downstream optically modulated signal that is sent to the nodes. In turn, the optical nodes convert inbound signals to RF energy and return RF signals to optical signals along a return path. In the specification, the drawings, and the claims, the terms "forward path" and "downstream" may be interchangeably used to refer to a path from a head end to a node, a node to a subscriber, or a head end to a subscriber. Conversely, the terms "return path", "reverse path" and "upstream" may be interchangeably used to refer to a path from a subscriber to a node, a node to a head end, or a subscriber to a head end.

Each node 104 serves a service group comprising one or more customer locations. By way of example, a single node 104 may be connected to thousands of cable modems or other subscriber devices 106. In an example, a fiber node may serve between one and two thousand or more customer locations. In an HFC network, the fiber optic node 104 may be connected to a plurality of subscriber devices 106 via coaxial cable cascade 111, though those of ordinary skill in the art will appreciate that the coaxial cascade may comprise a combination of fiber optic cable and coaxial cable. In some implementations, each node 104 may include a broadband optical receiver to convert the downstream optically modulated signal received from the head end or a hub to an electrical signal provided to the subscribers' devices 106 through the coaxial cascade 111. Signals may pass from the node 104 to the subscriber devices 106 via the RF cascade 111, which may be comprised of multiple amplifiers and active or passive devices including cabling, taps, splitters, and in-line equalizers. It should be understood that the amplifiers in the RF cascade 111 may be bidirectional, and may be cascaded such that an amplifier may not only feed an amplifier further along in the cascade but may also feed a large number of subscribers. The tap is the customer's drop interface to the coaxial system. Taps are designed in various values to allow amplitude consistency along the distribution system.

The subscriber devices 106 may reside at a customer location, such as a home of a cable subscriber, and are connected to the cable modem termination system (CMTS) 120 or comparable component located in a head end. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or similar electronic client, end, or terminal devices of subscribers. For example, cable modems and IP set top boxes may support data connection to the Internet and other computer networks via the cable network, and the cable network provides bi-directional communication systems in which data can be sent downstream from the head end to a subscriber and upstream from a subscriber to the head end.

References are made in the present disclosure to a Cable Modem Termination System (CMTS) in the head end 102. In general, the CMTS is a component located at the head end or hub site of the network that exchanges signals between the head end and client devices within the cable network infrastructure. In an example DOCSIS arrangement, for example, the CMTS and the cable modem may be the endpoints of the DOCSIS protocol, with the hybrid fiber coax (HFC) cable plant transmitting information between these endpoints. It will be appreciated that architecture 100 includes one CMTS for illustrative purposes only, as it is in fact customary that multiple CMTSs and their Cable Modems are managed through the management network.

The CMTS 120 hosts downstream and upstream ports and contains numerous receivers, each receiver handling communications between hundreds of end user network elements connected to the broadband network. For example, each CMTS 120 may be connected to several modems of many subscribers, e.g., a single CMTS may be connected to hundreds of modems that vary widely in communication characteristics. In many instances several nodes, such as fiber optic nodes 104, may serve a particular area of a town or city. DOCSIS enables IP packets to pass between devices on either side of the link between the CMTS and the cable modem.

It should be understood that the CMTS is a non-limiting example of a component in the cable network that may be used to exchange signals between the head end and subscriber devices 106 within the cable network infrastructure.

For example, other non-limiting examples include a Modular CMTS (M-CMTSTM) architecture or a Converged Cable Access Platform (CCAP).

An EdgeQAM (EQAM) 122 or EQAM modulator may be in the head end or hub device for receiving packets of digital content, such as video or data, re-packetizing the digital content into an MPEG transport stream, and digitally modulating the digital transport stream onto a downstream RF carrier using Quadrature Amplitude Modulation (QAM). EdgeQAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Referring now to FIG. 2, an exemplary DAA architecture is disclosed, e.g., a R-PHY architecture, although as noted above, other DAA architectures may include R-MACPHY architectures, R-OLT architectures, etc. Specifically, a distributed CATV transmission architecture 150 may include a CCAP 152 at a head end connected to a plurality of cable modems 154 via a branched transmission network that includes a plurality of RPD nodes 153. The RPD nodes 153 perform the physical layer processing by receiving downstream, typically digital content via a plurality of northbound ethernet ports and converting the downstream to QAM modulated signals where necessary, and propagating the content as RF signals on respective southbound ports of a coaxial network to the cable modems. In the upstream direction, the RPD nodes receive upstream data content via the southbound RF coaxial ports, convert the signals to an optical domain, and transmit the optical data upstream to the CCAP 152. The architecture of FIG. 1 is shown as an R-PHY system where the CMTS operates as the CCAP core while Remote Physical Devices (RPDs) are located downstream, but alternate systems may use a traditional CCAP operating fully in an Integrated CMTS in a head end, connected to the cable modems 1544 via a plurality of nodes/amplifiers.

The techniques disclosed herein may be applied to systems compliant with DOCSIS. The cable industry developed the international Data Over Cable System Interface Specification (DOCSIS®) standard or protocol to enable the delivery of IP data packets over cable systems. In general, DOCSIS defines the communications and operations support interface requirements for a data over cable system. For example, DOCIS defines the interface requirements for cable modems involved in high-speed data distribution over cable television system networks. However, it should be understood that the techniques disclosed herein may apply to any system for digital services transmission, such as digital video or Ethernet PON over Coax (EPoc). Examples herein referring to DOCSIS are illustrative and representative of the application of the techniques to a broad range of services carried over coax As noted earlier, although CATV architectures have historically evolved in response to increasing consumer demand for bandwidth, many applications such as video teleconferencing, gaming, etc. also require low latency. Specifically, certain services cannot be further improved simply by adding additional bandwidth. Such services include web meetings and live video, as well as online gaming or medical applications. For these applications, latency—as well as jitter, which can be thought of as variation in latency—are at least equally important as bandwidth.

For instance, in gaming applications that involve multiple players competing and collaborating over a common server, latency has an arguably greater impact on gameplay than bandwidth. In this fast-paced environment, millisecond connection delays are the difference between success and failure. As such, low latency is a well-recognized advantage in online multiplayer games. With lower latency—that is, the time that packets spend reaching gaming server and returning a response to the multiplayer gamer—players can literally see and do things in the game before others can. The same analysis can be applied to finance and day trading.

End-to-end latency has several contributing causes, the most obvious being propagation delay between a sender and a receiver; however, many other causes of latency are at least as significant. For example, a gaming console will itself introduce approximately 50 ms of latency and creating an image on-screen by a computer or console takes between 16 to 33 ms to reach the screen over a typical HDMI connection. However, the most significant source of latency is queuing delay-typically within the access network shown in FIGS. 1 and 2. As most applications rely on Transmission Control Protocol (TCP) or similar protocols, which emphasize optimizing bandwidth, the 'congestion avoidance' algorithms in the access networks will adjust to the link which is the speed. Buffers and queues on that link will be stressed to the limit, which will optimise bandwidth but increase the latency.

Typically, all network traffic merges into a single DOCSIS service flow. This traffic includes both streams that build queues—like video streaming apps—and streams that do not build queues—like multiplayer gaming apps. The challenge that this single-flow architecture presents is a lack of distinction between the two types of traffic. Both a gaming application and a video streaming application are treated the same on the network, but their needs are very different: A queueing delay might not matter for the purpose of watching a YouTube video, which can buffer and play asynchronously, but for competing in a multiplayer game, having data packets held in a queue is a meaningful disadvantage. The indiscriminate treatment of traffic on today's DOCSIS networks adds latency and jitter precisely where it's unwanted.

Low Latency DOCSIS (LLD) resolves the Queueing latency by using a dual queuing approach. Applications which are not queue building (such as online gaming applications) will use a different queue than the traditional queue building applications (such as file downloads). Non-queue building traffic will use small buffers—minimizing the latency—, queue building traffic will use larger buffers—maximizing the throughput. LLD therefore allows operators to group up- and downstream service flows to enable low-latency services.

Specifically, the LLD architecture offers several new key features, including ASF service flow encapsulation, which manages the traffic shaping of both service flows by enforcing an Aggregate Maximum Sustained Rate (AMSR), in which the AMSR is the combined total of the low-latency and classic service flow bit rates, Proactive Grant Service scheduling, which enables a faster request grant cycle by eliminating the need for a bandwidth request, as well as other innovations such as Active Queue Management algorithms which drop selective packets to maintain a target latency.

One other feature inherently necessary for LLD is Service flow traffic classification i.e., classifying packets as belonging either to the normal service flow of the low-latency service flow. Though packet classification plays a crucial role in implementing LLD, the DOCSIS standard is silent on how traffic is identified and put on the low latency service flow. As noted earlier, obvious implementations may involve specific applications such as gaming software or consoles, gaming servers etc. mark packets as belonging to a LLD service flow, or alternately customer premises gateways analyze packets to mark selected traffic as low-latency traffic, such implementations are burdensome.

The present disclosure describes novel devices, systems, and methods that reliably identify packets in a service flow as being low latency packets, and in a manner that does not rely on specific hardware at either a client device or a server (gaming, financial, etc.) communicating with that client device. Specifically, the present disclosure describes architectures that employ a first, preferably cloud-hosted low latency DOCSIS (LLD) agent that identifies characteristics or "fingerprints" of low-latency traffic, and communicates those characteristics to a second, network-hosted low latency DOCSIS agent that identifies individual packets that match the "fingerprints" specified by the first LLD agent, and processes those packets to add appropriate data to the packets by which network elements (routers, queues, etc.) can identify and direct the packets to a respectively appropriate one of a low-latency flow or a standard, non-low-latency flow.

As shown in FIGS. 3A-3D, the disclosed device, systems, and methods may be used in an in-line architecture, where the second LLD DOCSIS agent is inserted in-line with the service flows, or alternately may be used in a hairpin-style architecture where a router in the network diverts low-latency traffic to the second LLD agent. Specifically, an application server 210, which may be for example, a gaming server, financial server, video conferencing server, etc. may be in communication with one or more client devices 212, which each communicate with the server 210 using an in-home gateway 214 such as a cable modem and optionally a wireless router 216. Data packets communicated between the client device 212 and the server 210 are delivered via a wide-area network 218 such as the Internet, an intervening router network 220 and an access network (such as the network 100 shown in FIG. 1 or the network 150 shown in FIG. 2).

In each of FIGS. 3A-3D, the first LLD agent 226 (whose operation will be described later) may be hosted by a service provider in a public cloud 224, or in alternative embodiments may be hosted in-house by a service provider. In either circumstance, the first LLD agent 226 may communicate with the client device 212, the server 210, or the second LLD agent via the Internet 218, router network 220, and access network 222. In some embodiments, particularly in the hairpin implementation shown in FIGS. 3B and 3D, the first LLD agent 226 and the second LLD agent 228 may be in direct communication without reliance on the Internet 218, etc.

Figure 3A:
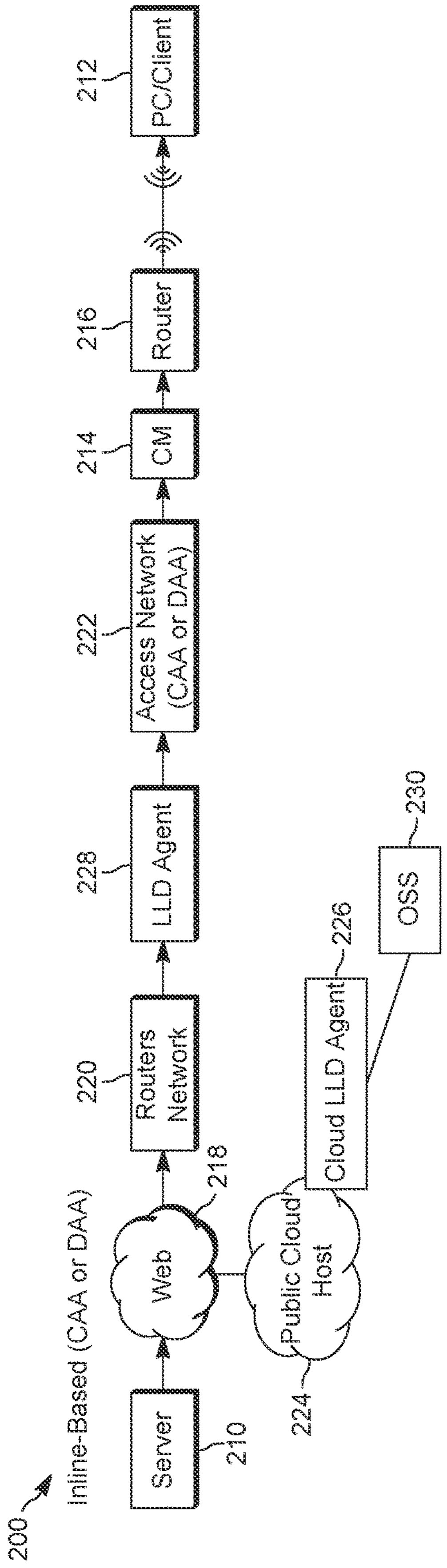
FIG. 3A shows an exemplary low-latency architecture in accordance with the present disclosure, with a cloud-based control plane LLD agent and an in-line data plane LLD agent, with an exemplary downstream service flow.

Referring specifically to FIGS. 3A, in an in-line architecture 200, the second LLD agent 228 (whose operation will be described in more detail later in this specification) is located in-line with the service flows, positioned between the router network 220 and the access network 222. In this configuration, the second LLD agent examines all packets flowing between the access network 222 and the router network 220, using the "fingerprints" provided by the first LLD agent 226 to identify which to further process so as to enable the access network 222 to correctly route such packets in a low-latency service flow as defined by the DOCSIS standard. This in-line arrangement thus necessitates a relatively large amount of processing power on the part of the second LLD agent 228.

Figure 3B:
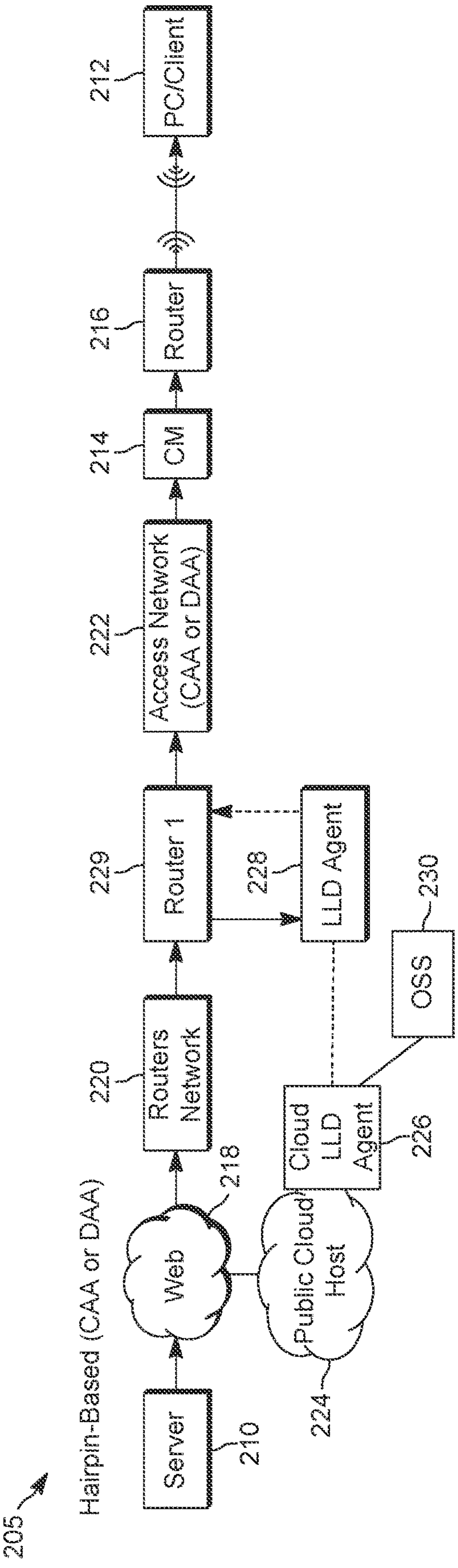
FIG. 3B shows an exemplary low-latency architecture in accordance with the present disclosure, with a cloud-based control plane LLD agent and hairpin-style data plane LLD agent, with an exemplary downstream service flow.

Referring to FIG. 3B, an alternate hairpin-type architecture 205 positions the second LLD agent 228 outside of the direct flow between the client device 212 and the server 210. In this configuration, the second LLD agent 228 uses the "fingerprints" provided by the first LLD agent 226 to set the policies of a router 229 of the router network 220 (indicated by the dashed line in FIGS. 3B and 3D), by which the router 229 can identify packets that should be marked for a low-latency service flow, and thereby forward such traffic to the LLD agent, which in turn processes only those packets to mark them in a manner that enables the access network 222 to correctly route such packets in a low-latency service flow as defined by the DOCSIS standard. The second LLD agent 228 then returns the marked packets to the router 229 for further transit along the network 205. In this hairpin-style architecture, the second LLD agent 228 needs a relatively low amount of processing power because it only needs to examine and process those packets that the router 229 forwards to it. Those of ordinary skill in the art sill recognize that the hairpin-style architecture may instead divert packets to and from a CMTS, RPD, or other device in the access network 220 rather than router 229.

Figure 3C:
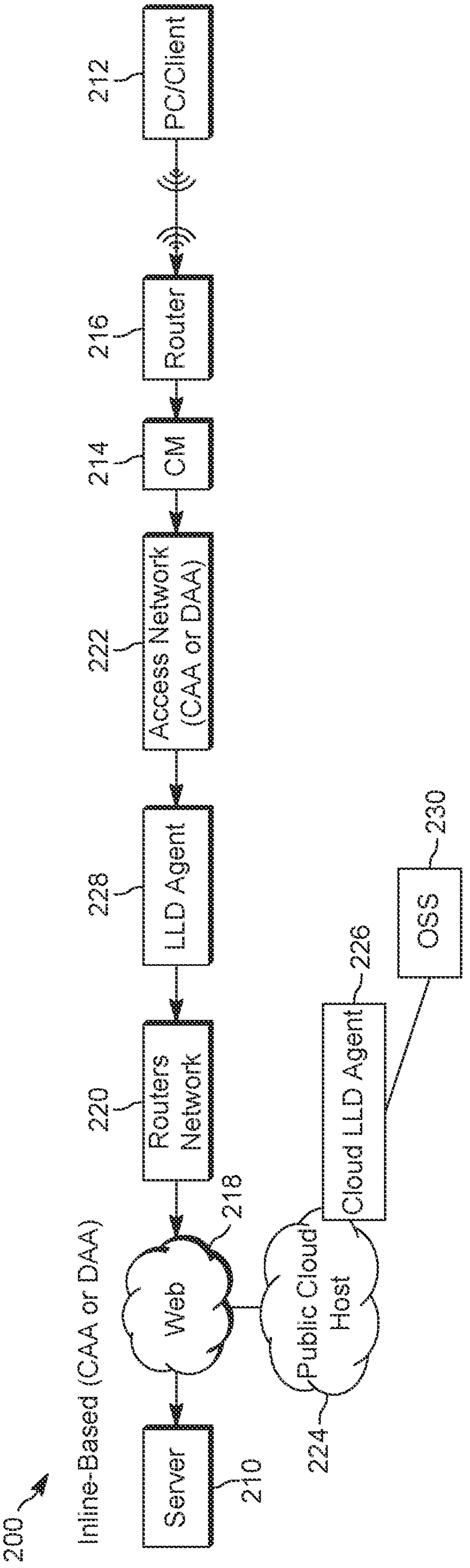
FIGS. 3C and 3D show exemplary upstream service flows in the architectures of FIGS. 3A and 3B, respectively.
Figure 3D:
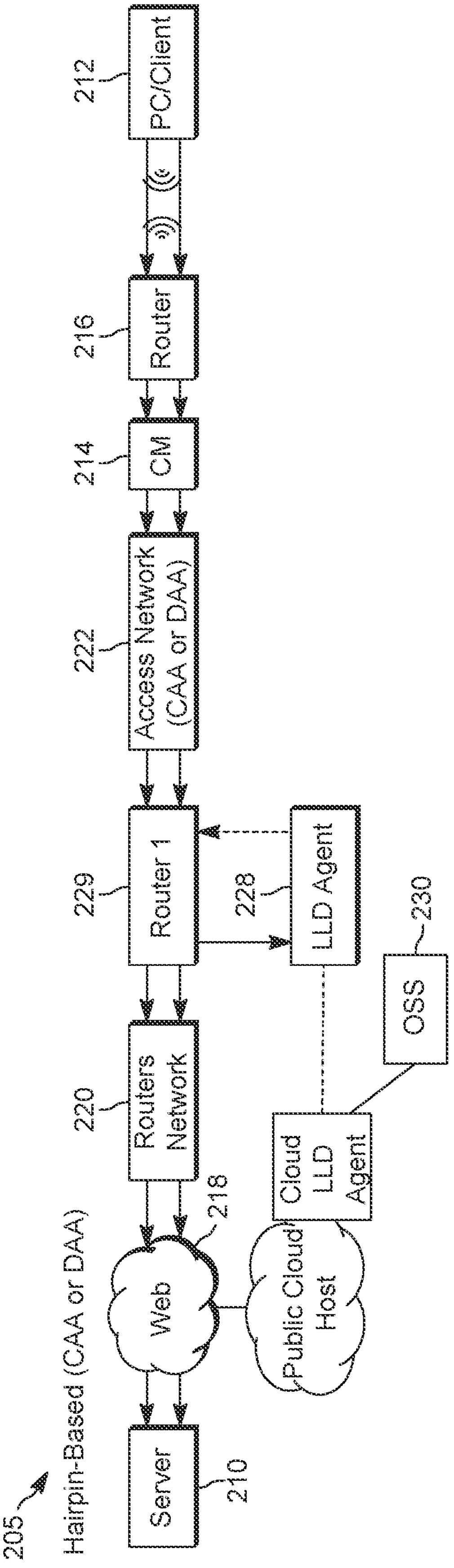

FIGS. 3A and 3B each show the manner in which downstream traffic flows through the network for their respective architectures, while FIGS. 3C and 3D each show the manner in which upstream traffic flows through the network for their respective architectures.

The role of the first LLD agent 226 is preferably to identify characteristics or "fingerprints" of low-latency traffic. This may be accomplished in any one of a number of desired manners. For example, the LLD agent 226 may store a current list of games (or other applications) along with information such as IP addresses, ports, etc. of client devices and servers. Thus, as explained later, the LLD agent 226 may receive information from a client device or a server indicating the initiation of a particular game or application and identify the source and destination IP addresses/ports. Alternatively, the first LLD agent 226 may be provisioned with machine learning or artificial intelligence algorithms that enable it to determine for itself what traffic is low latency traffic, and also identify the source/destination IP and port addresses of traffic in such flows.

Regardless of the particular manner in which the first LLD agent 226 identifies a low-latency flow, the first LLD agent 226 preferably uses the dynamic IP address and port numbers of the identified flows as "fingerprints," and provides those fingerprints to the second LLD agent 228. The second LLD agent 228, in the in-line architecture 200 uses those fingerprints to identify low latency traffic and process that traffic in a manner such that the access network 228 can recognize it as such and direct the low-latency traffic to the appropriate queues, etc. For the access network 222, the second LLD agent 228 may preferably communicate with the CCAP/RPD/RMD and/or CM to add classifiers to correspond to the selected games selected by the user.

Specifically, in the downstream direction, the second LLD agent 228 may preferably mark each packet identified as belonging to a low latency flow using a Type of Service (ToS) field. Specifically, Quality of Service (QoS) protocols for communications networks implement a Differentiated Service (DiffServ) solution that stores a value in the IP header of a data packet to indicate the priority a network should allocate to the packet relative to other packets. The IP header 18 includes a Type of Service (ToS) field 20. The ToS field 20 is an 8-bit identifier that was originally intended to store a six-bit value where the first three bits specified a precedence or importance value, the next three bits each specified a normal or improved handling for delay, throughput, and reliability, respectively, and the last two bits were reserved. In practice, however, the first three bits assigned for precedence were never used. Later, the DiffServ architecture specified the use of the ToS field to store a 6-bit code that indicates the precedence for a packet. The remaining two bits of the 8-bits are used to signal congestion control, defined by RFC3168. These bits may be modified by middle-boxes (or intermediary routers) and are used to signal congestion that may occur across the end-to-end path. The following table shows common code values and their meanings.

| DSCP value | Description (RFC 4594 [21]) | WebRTC [4] Flow Type/Priority |
|---|---|---|
| CS1* | Low-priority data | Any/Very Low |
| AF42* | Multimedia conferencing | 1/Medium or High |
| EF* | Telephony | 1/Medium or High |
| CS0 | Standard | Any/Low |
| AF11, AF12, AF13 | High-throughput data | 4/Medium (AF11 only) |
| AF21 | Low-latency data | 4/High |
| AF31 | Multimedia streaming | 3/High |
| AF41 | Multimedia conferencing | 2/High |
| CS4 | Real-time interactive | not defined |
| CS5 | Signaling | not defined |
| CS7 | Reserved for future use | not defined |
| 1, 2, 4, 6, 41 | Undefined values | not defined |

In some preferred embodiments, the downstream classifier may be a single DSCP bit that identifies a packet as either belonging to a low latency flow or not belonging to a low latency flow. In other embodiments, more bit values may be used, particularly in systems that include varying levels of low latency. For example, some MSOs may wish to offer several tiers of low latency service, and the 8-bit ToS field may be used to classify each of these levels of service. In some embodiments, downstream traffic may also be tagged by the second LLD agent 228 for WiFi processing.

For upstream packets, these packets run from the client device 212/cable modem 214 through the access network 22. They can be identified by the second LLD agent 228 for upstream backbone processing based on Dynamic IP addresses, ports, etc. and marked as previously described. In some embodiments, upstream low-latency traffic may also be processed for anti-bleaching (i.t. to prevent ToS information from being overwritten or otherwise lost in the router network 220 or the Internet 218).

Those of ordinary skill in the art will appreciate that, although specific examples of information placed in the ToS field to identify and "fingerprint" low latency traffic included IP and port addresses, other information may also be used for that purpose. For example, such information could include a ToS mask, an IP protocol, an IP source address, an IP source mask, an IP destination address, an IP destination mask, an IP source port start and port end (allowing for a range of ports), a destination port start and port end (allowing for a range of ports), a destination MAC address, a source MAC address, an Ethernet/DSA/MAC type, a user priority (IEEE 802.1P), a virtual LAN identification (VLAN ID), or any other information useful in identifying a particular flow as being designated as low latency.

In the hairpin-style architectures of FIGS. 3B and 3D, the second LLD agent 228 preferably sets the policies of the router 229 to divert low latency traffic using Access Control Lists (ACLs) based on the "fingerprints" provided by the first LLD agent 226. These ACL lists (routing entries) may be injected into the router 229 using a control channel or using dynamic routing protocols. ACLs (routes) may be injected only when needed i.e., when games are active only, and in some embodiments may be one entry for multiple games. The configuration is therefore dynamic (routes and ACLs are added and deleted, but those entries are preferably static when entered, until deleted-meaning that they are not changed in real time.

Preferably the dataplane (tagging of traffic by the first LLD agent 228 and subsequent treatment by the access network 222) is local to each MSO network to avoid introducing additional latency. However, in some embodiments, the control plane may be shared across service groups, CCAPS etc.

Figure 4A:
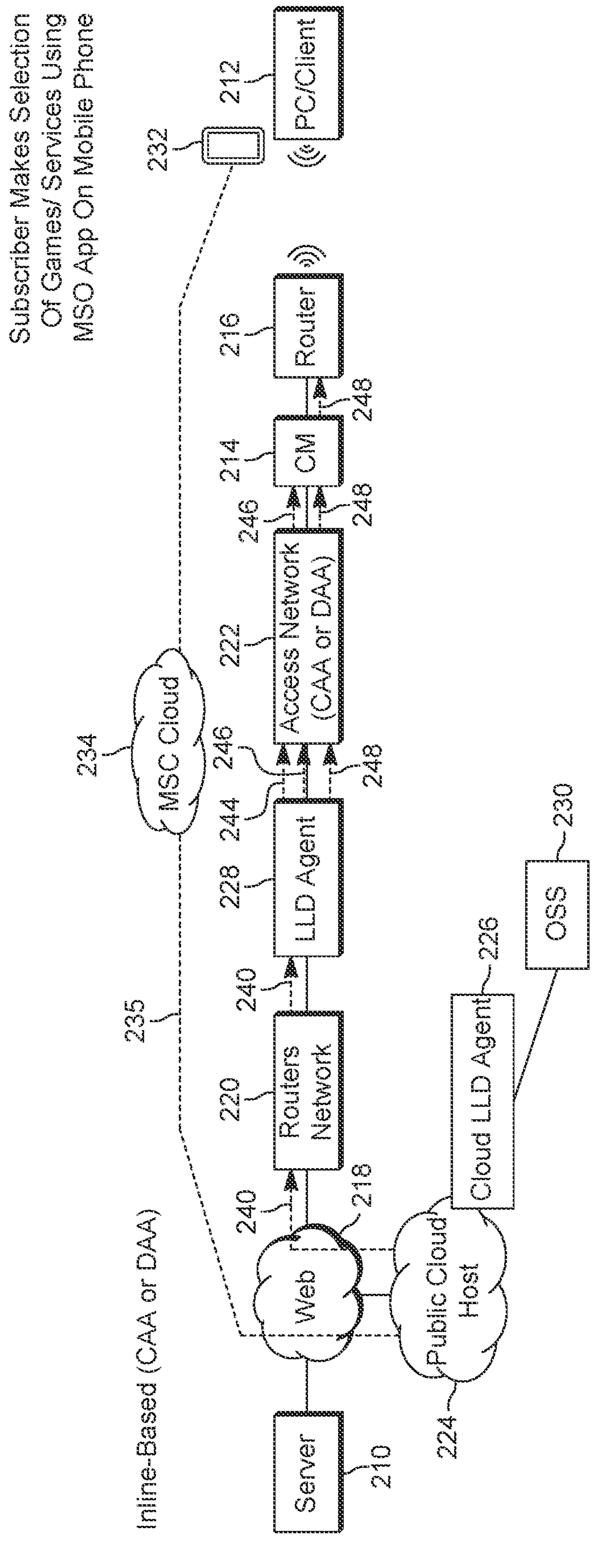
FIGS. 4A and 4B show a first embodiment for control packet flow for in-line and hairpin implementations, respectively, of the disclosed systems and methods.
Figure 4B:
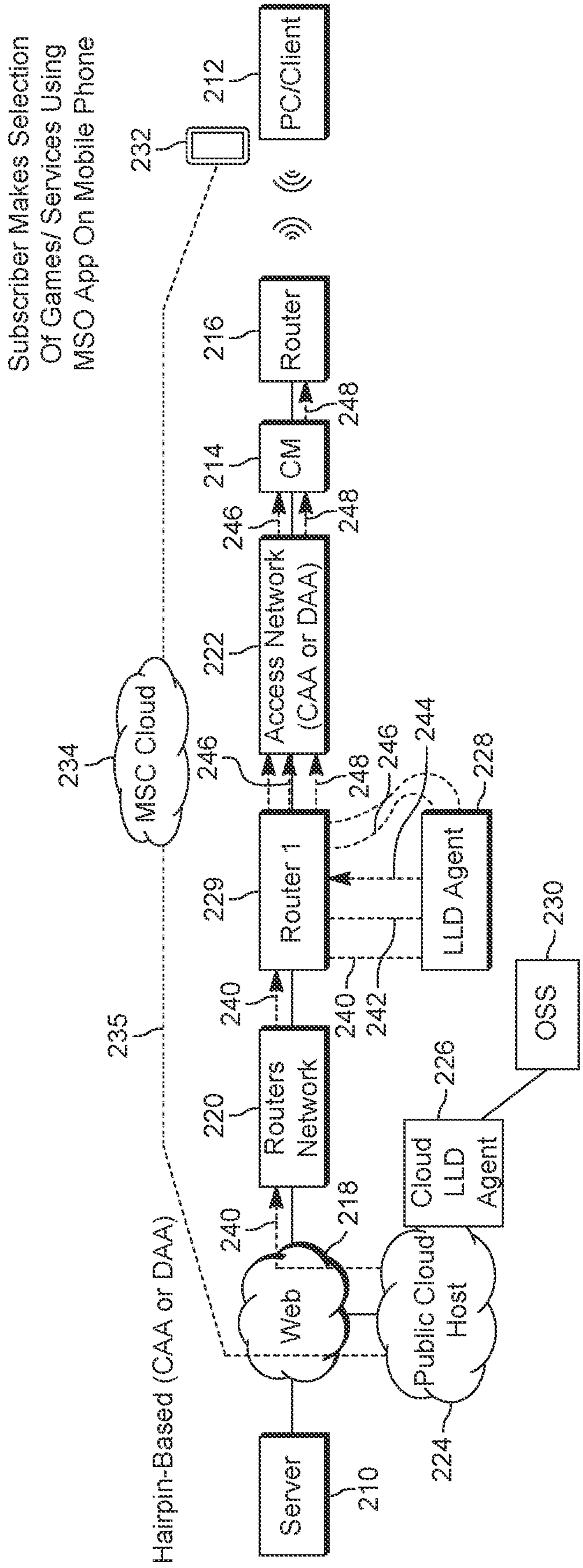

FIGS. 4A and 4B show an exemplary embodiment of the control flow of the systems of FIGS. 3A-3D. In this embodiment, the subscriber uses an MSO app or other software to makes a selection via client device 232 (in this case a cell phone), through an MSO cloud and the Internet 218 to the first LLD agent 226, through communication path 235, to select a game or other service that requires low latency treatment. The first LLD agent 226 uses its internal database of games, applications etc. to identify the "fingerprints" of the ensuing low latency traffic packets and forwards those fingerprints to the second LLD agent 226 via control path 240.

The second LLD agent 228, in turn, in the in-line architecture of FIG. 4A, uses those fingerprints to identify low latency packets traversing the network, or in the hairpin architecture of FIG. 4B, sets the policies of router 229 to allow the router 229 to identify and route traffic to the second LLD agent 228 using control path 242. The second LLD agent 228 also sends control messages to the access network 222, the cable modem 214, and the router 216 via control paths 244, 246, and 248, respectively.

Figure 5A:
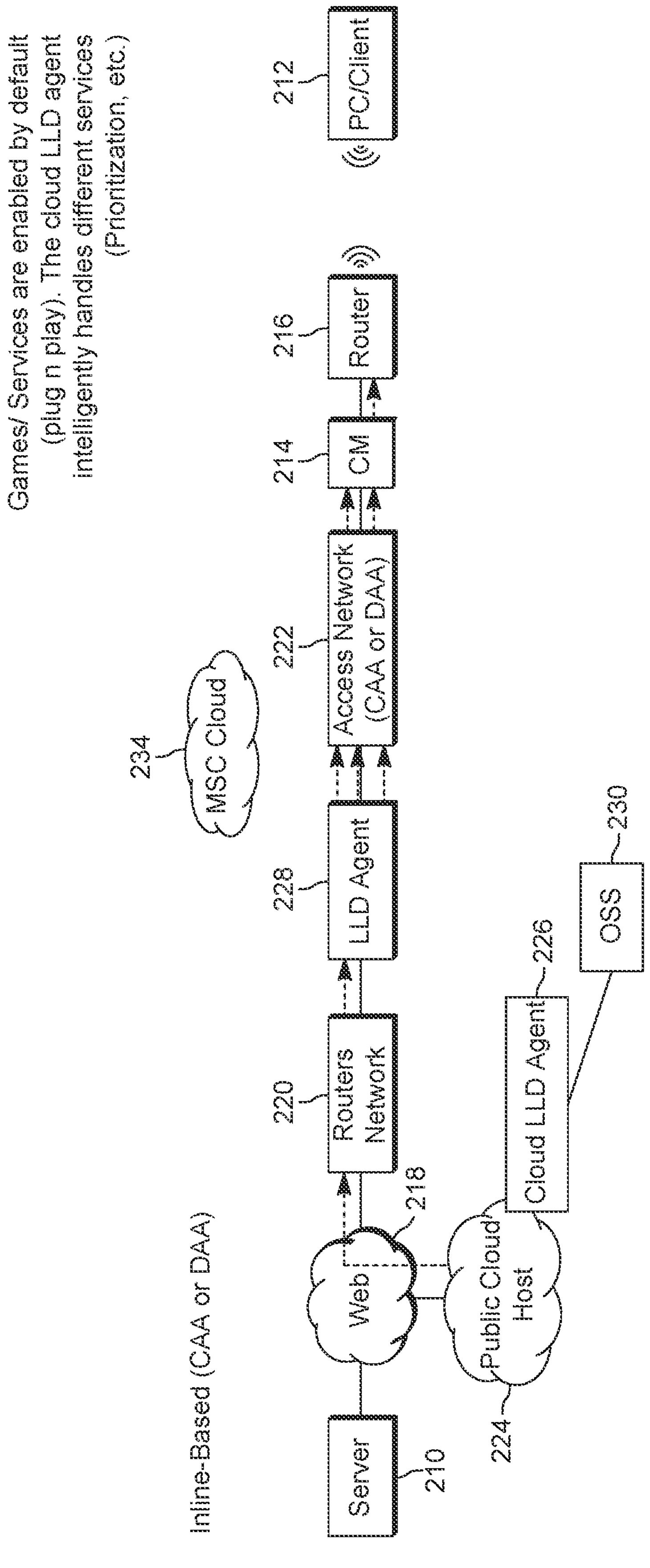
FIGS. 5A and 5B show a second embodiment for control packet flow for in-line and hairpin implementations, respectively, of the disclosed systems and methods.
Figure 5B:
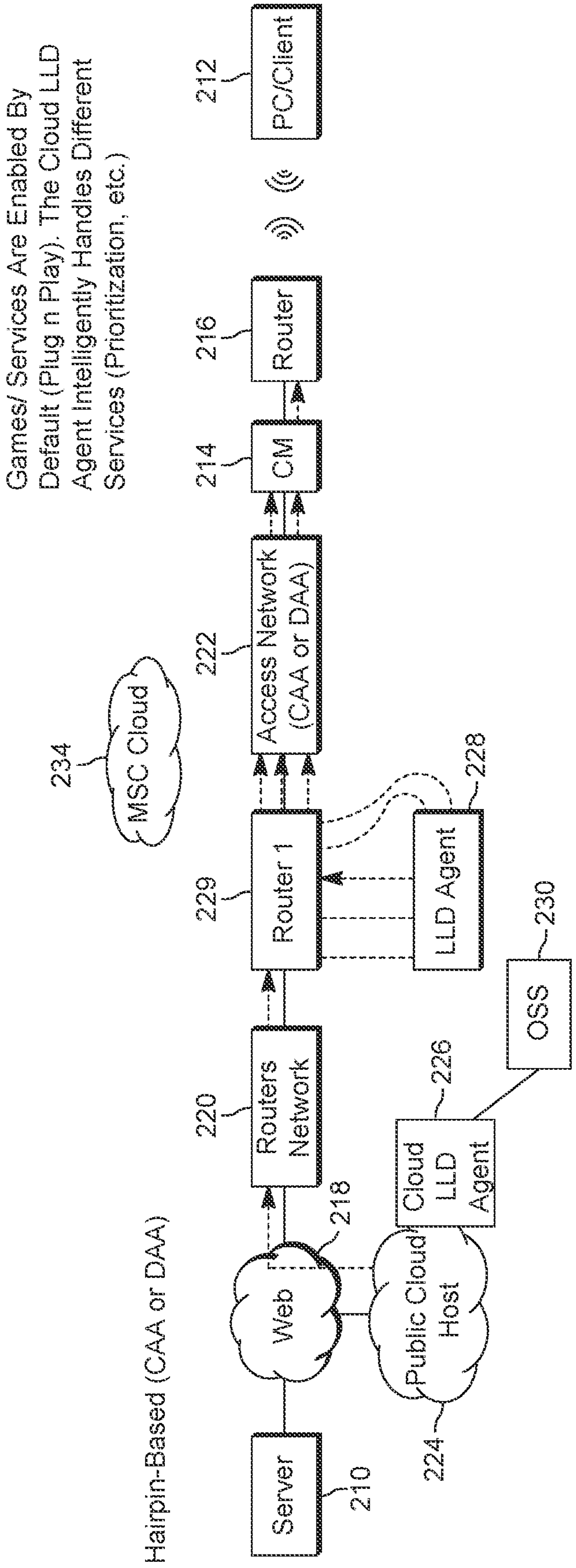

FIGS. 5A and 5B show an alternate embodiment where low latency games/services are enabled by default (plug and play). In this embodiment, the control path 234 through the MSO cloud is eliminated, and the first LLD agent 226 itself intelligently identifies and effectuates low latency services using, e.g., artificial intelligence/machine learning algorithms as previously described.

Figure 6A:
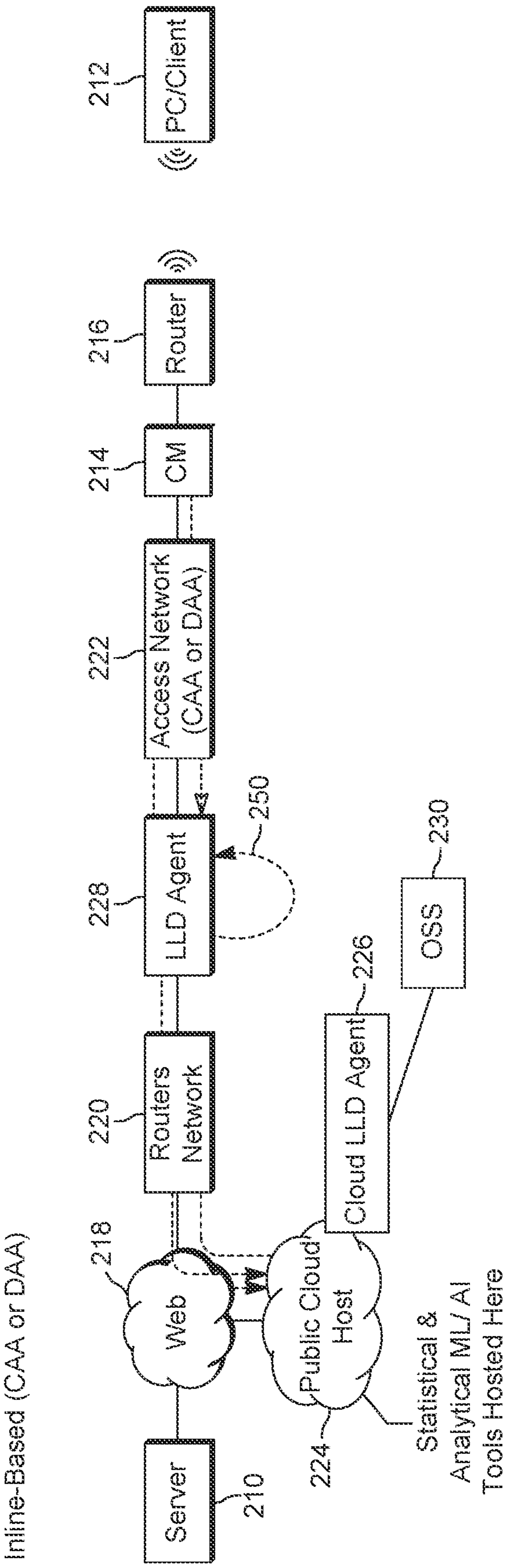
FIGS. 6A and 6B each show a respective embodiment for statistical and data aggregation and collection in the in-line and hairpin implementations of the disclosed systems and methods.
Figure 6B:
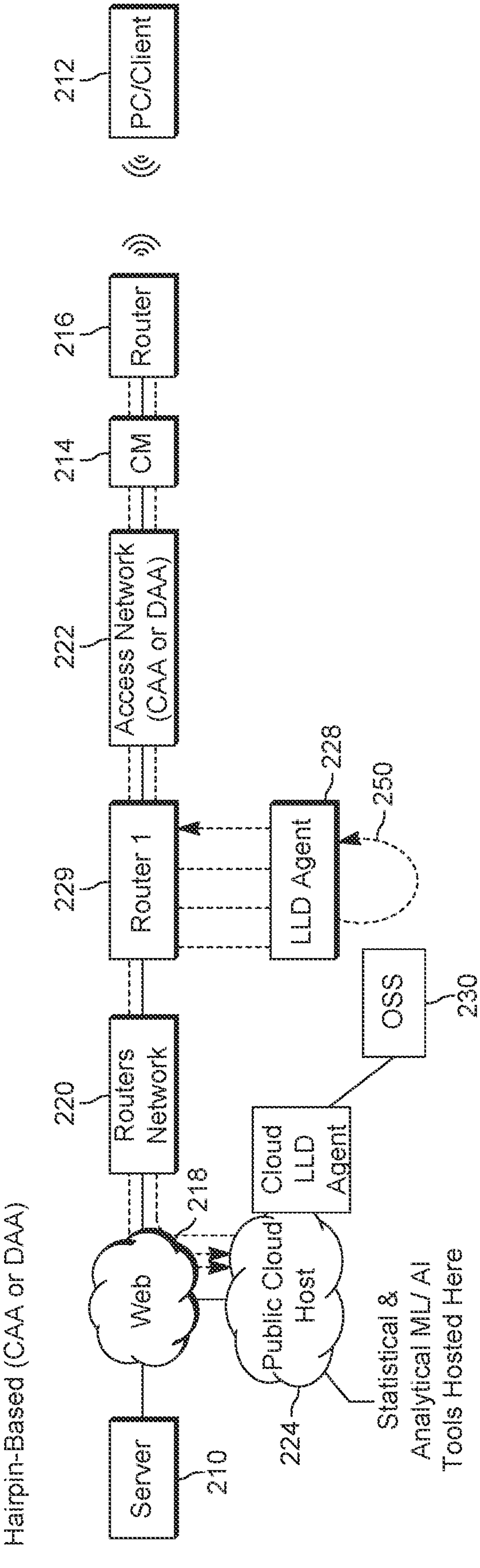

Referring to FIGS. 6A and 6B, the architectures shown in FIGS. 3A-5B are each preferably capable of collecting statistics that may, for example, be used to provide real time performance information on the latency achieved. In some embodiments, the first LLD agent 226 hosts dashboards that show summary statistics, configuration panels for routers and other network elements like CCAPs, RPDs, cable modems, etc., or even in other parts of the network. Measurement instrumentation can be placed in such network elements to allow the collection of such statistics. The second LLD agent 228 may also collect 250 its own statistics base don TCP handshake packets to calculate the round trip time of different loops. In some embodiments, these statistics, or the measurements used to calculate them, are forwarded to the first LLD agent 226. Aggregate information collected pr calculated by the first LLD agent 226 may be forwarded to the client device 212, and/or quality assurance systems or other network machine learning/AI engines hosted in Operating Support System(s) 230 that may provide network optimization functions. In this manner, the devices, systems, and methods described in this specification may be used to provide Quality of Service monitoring and troubleshooting.

Figure 7A:
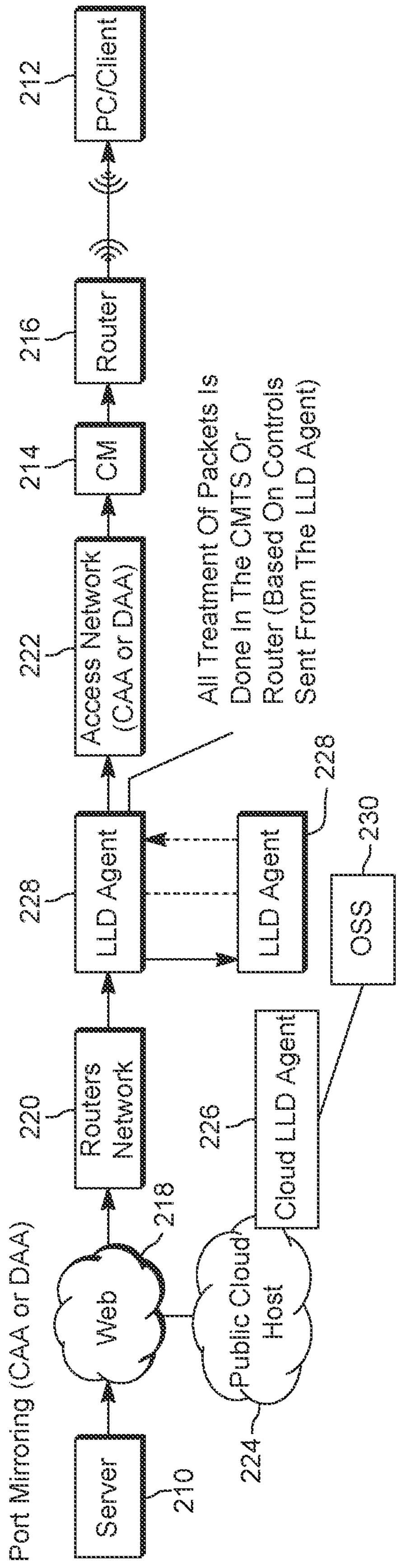
FIGS. 7A and 7B show an alternate port mirroring embodiment for the hairpin implementation of the disclosed systems and methods in downstream and upstream directions, respectively.
Figure 7B:
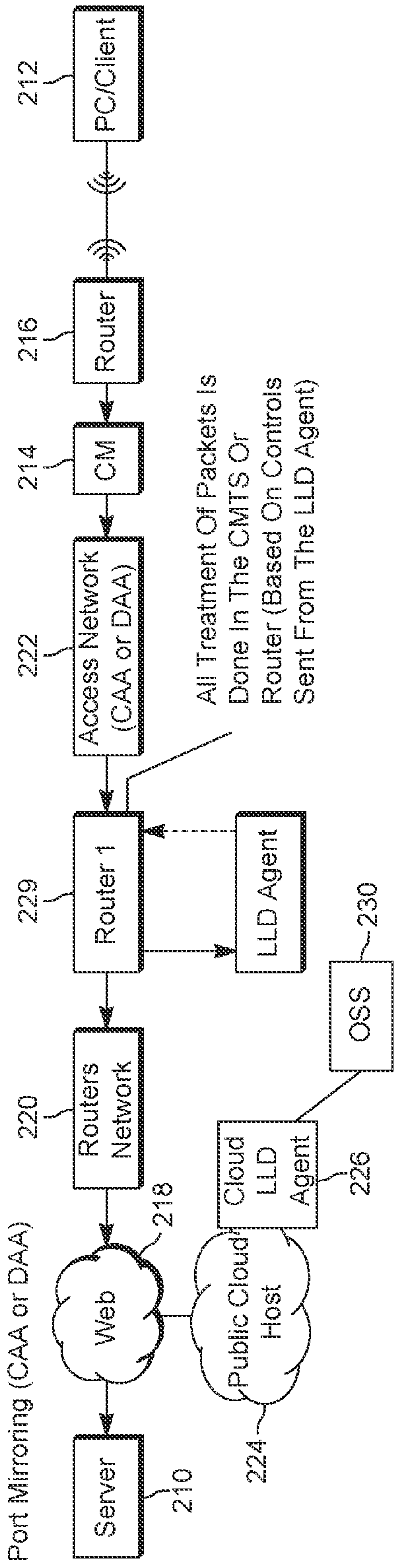

FIGS. 7A and 7B show an alternate embodiment to the hairpin architecture previously described, where, instead of routing identified LLD packets to the second LLD agent 228, the router 229 instead implements a port-mirroring solution. In this implementation, low latency packets identified by the router 229 using the policies set by the second LLD agent 228 are mirrored to a port to the second LLD agent. In this manner, all processing of the packets is performed in the router 229 (or CMTS) based on control messages sent from the second LLD agent 228.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word “comprise” or a derivative thereof, when used in a claim, is used in a nonexclusive sense that is not intended to exclude the presence of other elements or steps in a claimed structure or method.

The invention claimed is:

1. In combination with a communications network conforming to the Data Over Cable Service Interface Specification (DOCSIS), a processing device comprising a second low latency DOCSIS (LLD) agent configured to cause, and causing at least one other device, remote from the second LLD agent, to propagate packets of low latency traffic through the network faster than packets of traffic that are not low latency, using characteristics of traffic intended to be low latency and communicated to the second LLD agent by a first LLD agent remote from the second LLD agent and remote from the at least one other device.

2. The second LLD agent of claim 1 configured to separate first packets of traffic identified as intended to be low latency from packets not intended to be low latency.

3. The second LLD agent of claim 2 configured to add data to the identified first packets that enables the communications network to propagate the packets of low latency traffic faster than packets of traffic that is not low latency.

4. The second LLD agent of claim 1 configured to use the characteristics to cause the at least one other device in the communications network to separate the first packets of traffic intended to be low latency from the packets not intended to be low latency, and divert the separated packets to the second LLD agent.

5. The second LLD agent of claim 4 configured to add data to the identified first packets that enables the communications network to propagate the packets of low latency traffic faster than the packets of traffic that is not low latency, and send the diverted packets back to the at least one other device in the communications network.

6. The second LLD agent of claim 5 wherein the at least one other device in the communications network is a router.

7. The second LLD agent of claim 5 wherein the at least one other device in the communications network is an access network device.

8. The second LLD agent of claim 4 capable of sending control messages to the communications network.

9. The second LLD agent of claim 4 capable of sending control messages to a cable modem in premises of a subscriber.

10. The second LLD agent of claim 4 capable of sending control messages to a router in premises of a subscriber.

11. In combination with a communications network conforming to the Data Over Cable Service Interface Specification (DOCSIS), a processing device comprising a first low latency DOCSIS (LLD) agent configured to cause, and causing at least one other device, remote from the first LLD agent, to propagate packets of low latency traffic faster than packets of traffic that is not low latency, using characteristics of traffic intended to be low latency and communicated from the first LLD agent to a second LLD agent remote from the first LLD agent and remote from the at least one other device.

12. The first LLD agent of claim 11, which identifies the characteristics based on a communication from a client device desiring to propagate low latency traffic through the network.

13. The first LLD agent of claim 11, which identifies the characteristics free from a communication from a client device desiring to propagate low latency traffic through the network.

14. The first LLD agent of claim 11, which identifies the characteristics using at least one of an Artificial Intelligence (AI) algorithm or a machine learning algorithm.

15. The first LLD agent of claim 11, which identifies the characteristics using at least one of a source Internet Protocol (IP) address, a destination IP address, a source port, and a destination port.

* * * * *